(12) United States Patent
Peretto et al.

(10) Patent No.: US 8,253,571 B2
(45) Date of Patent: Aug. 28, 2012

(54) APPARATUS FOR SENSING IMPACT OF A BODY ON A TRIP LOCATED ON A SUPPORT

(75) Inventors: Lorenzo Peretto, Fratta Polesine (IT); Gaetano Pasini, Marano Sul Panaro (IT); Roberto Tinarelli, Bologna (IT); Pierpaolo Zennaro, Rovigo (IT)

(73) Assignee: Stageup S.R.L., Bologna (IT)

( * ) Notice: Subject to any disclaimer, the term of this patent is extended or adjusted under 35 U.S.C. 154(b) by 387 days.

(21) Appl. No.: 12/449,895

(22) PCT Filed: Feb. 27, 2008

(86) PCT No.: PCT/IT2008/000134
§ 371 (c)(1),
(2), (4) Date: Feb. 26, 2010

(87) PCT Pub. No.: WO2008/107924
PCT Pub. Date: Sep. 12, 2008

(65) Prior Publication Data
US 2010/0164730 A1     Jul. 1, 2010

(30) Foreign Application Priority Data

Mar. 2, 2007  (IT) .............................. VE2007A0013
Jul. 31, 2007  (IT) .............................. VE2007A0054

(51) Int. Cl.
*G08B 23/00* (2006.01)
*A63B 61/00* (2006.01)

(52) U.S. Cl. ..................................... 340/573.1; 473/467
(58) Field of Classification Search ............... 340/573.1; 473/467
See application file for complete search history.

(56) References Cited

U.S. PATENT DOCUMENTS

| | | | |
|---|---|---|---|
| 5,908,361 A * | 6/1999 | Fisher et al. ................... | 473/467 |
| 6,367,332 B1 * | 4/2002 | Fisher et al. ................... | 73/649 |
| 2006/0287140 A1 * | 12/2006 | Brandt et al. ................. | 473/467 |

FOREIGN PATENT DOCUMENTS

| | | |
|---|---|---|
| DE | 42 10 642 | 10/1993 |
| WO | WO 84/04692 | 12/1984 |
| WO | WO 89/05174 | 6/1989 |
| WO | WO 8905174 A1 * | 6/1989 |
| WO | WO 98/55190 | 12/1998 |

* cited by examiner

*Primary Examiner* — Daniel Wu
*Assistant Examiner* — Kam Ma
(74) *Attorney, Agent, or Firm* — Welsh Flaxman & Gitler LLC

(57) ABSTRACT

An apparatus for sensing impact of a body on a strip located on a support, characterized by comprising: a strip (2) of material presenting piezoelectric characteristics, applicable to a support in the region to be monitored; at least one continuous tape (4) made of conductive material and associated with said strip (2) in a manner parallel to it; a device (6) connected to said tape to condition the electric signal generated by the impact of said body on said strip (2); a device (12) for sensing said signal; a device (18) for indicating the sensed signal.

13 Claims, 2 Drawing Sheets

APPARATUS FOR SENSING IMPACT OF A BODY ON A TRIP LOCATED ON A SUPPORT

The present invention relates to an apparatus for sensing impact of a body on a strip located on a support.

Very often, especially in the practice of sporting activities, the need arises to objectively and precisely indicate the impact of a body, which can be for example a tennis ball, a volleyball ball etc., or even a player's foot, on a determined region of a playing field, for example on a line defining the playing area, or in proximity to the starting line of a long jump or javelin launching area.

For example, during a volleyball match, it is necessary to be able to establish whether the impact of a ball, generally thrown at high speed, occurs inside or outside or on a line defining the field, as the results of applying the rules of the game are different in each case. It is also necessary to be able to distinguish whether the body making impact in proximity to such a line is the ball or a part of the player's body (foot, hand, knee) because again this distinction results in different practical consequences. Finally it must also be able to be established whether at the moment of the impact a player remains outside the line at the end of the playing field or whether the player touches it, hence committing a foot fault.

All these situations are currently monitored visually by one or more referees, with inevitable difficulties and uncertainties linked to the speed of the impact and to the fact that very often the point of impact is hidden by one or more players.

In order to eliminate these drawbacks and to make this monitoring as reliable and objective as possible, video camera systems have already been proposed, but these have proved of high cost and complex and laborious installation, to the extent of being used only during particularly important events.

An object of the invention is to propose a device which enables reliable and objective sensing of the impact of a body on a strip located on a support, this expression signifying not only impact exactly on the strip, but also on that area of the support adjacent to said strip if the rules of the game require it.

Another object of the invention is to propose a device which is of economical construction and simple installation.

Another object of the invention is to propose a device which is versatile, in the sense of being adaptable for example to different situations, deriving from the use of balls of different dimensions and different characteristics, or from the different manner in which the point of impact has to be monitored as defined by the applicable rules of the game.

These and other objects which will be apparent from the ensuing description are attained, according to the invention, by an apparatus for sensing impact of a body on a strip located on a support, as described in claim 1.

Figure 1:
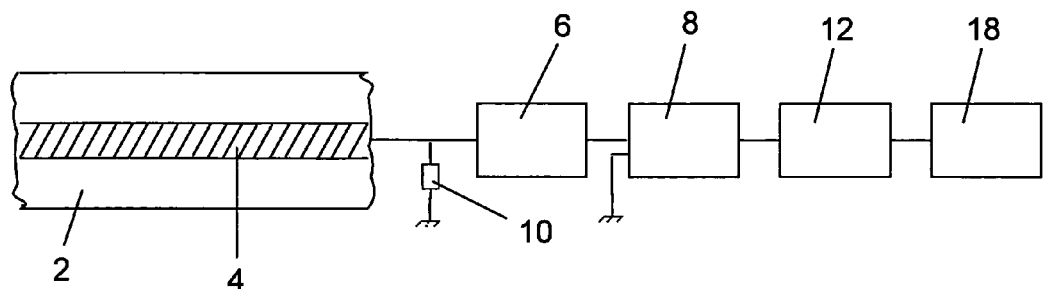
Figure 2:
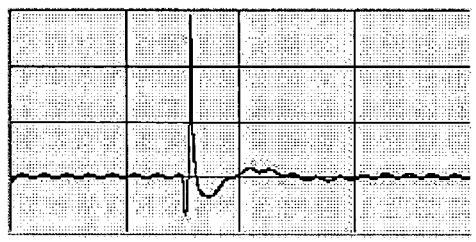
Figure 3:
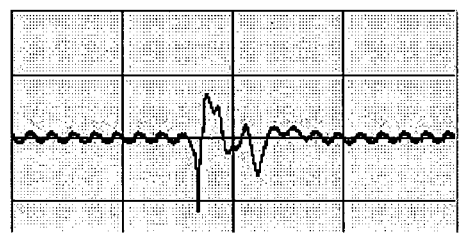
Figure 4:
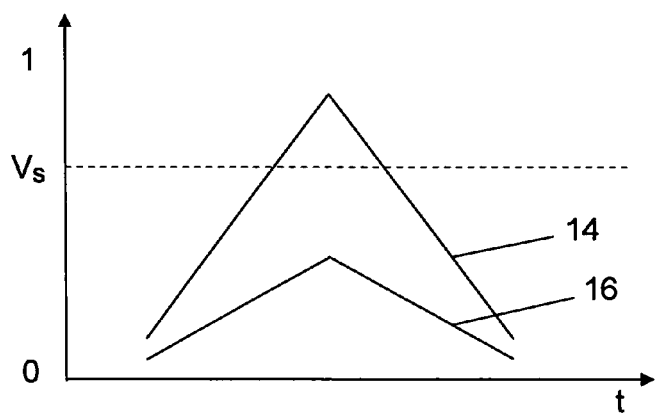
Figure 5:
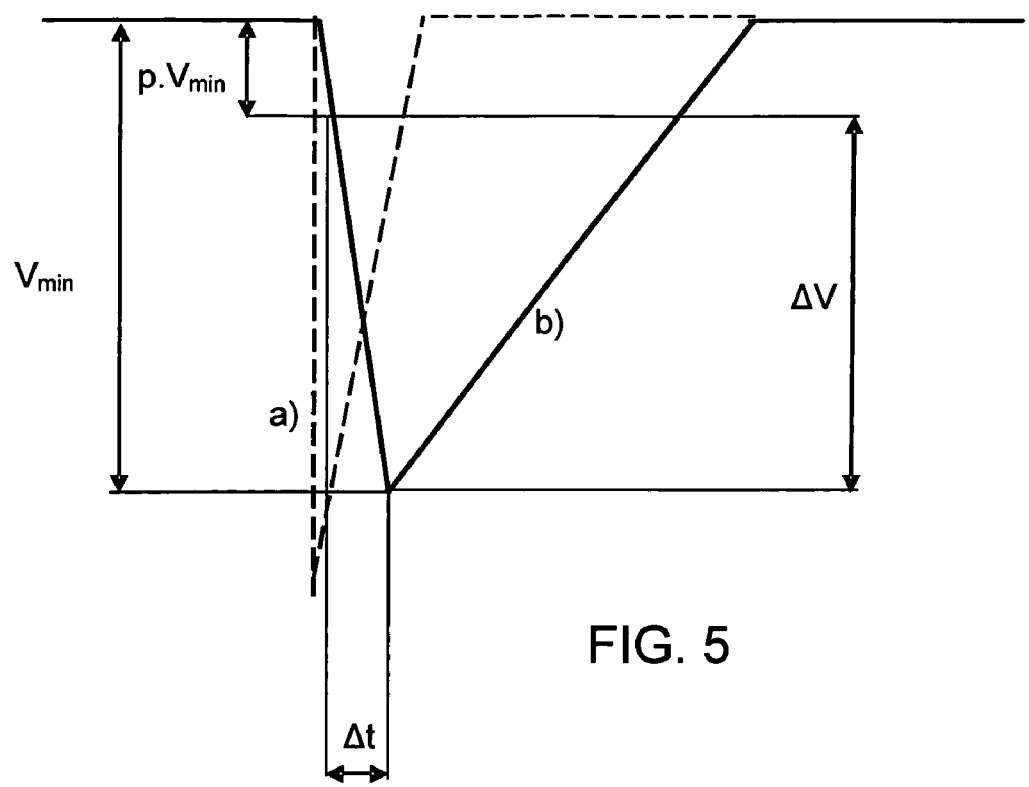
Figure 6:
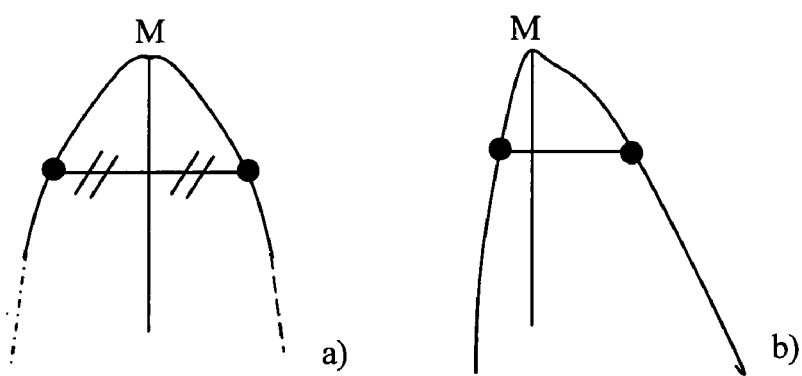

A preferred embodiment of the present invention is described in detail with reference to the accompanying drawings, in which:

FIG. 1 is a schematic view of an apparatus of the invention applied to a strip portion, FIG. 2 shows the pattern of the signal generated by the impact of a ball on said strip, FIG. 3 shows the pattern of the signal generated by the impact of a player's shoe on said strip, FIG. 4 shows the pattern of the cross-covariance curves in the case of two signals of FIG. 2 and FIG. 3, FIG. 5 shows the simplified pattern of the signal generated by the impact of a ball on a strip when using a different impact sensing algorithm, and FIG. 6 shows the simplified pattern of the signal generated by the impact of a ball on a strip when using another impact sensing algorithm.

As can be seen from FIGS. 1-4, which show a typical application of the device of the invention to a strip 2 defining a volleyball field, the device uses strips of a material with piezoelectric characteristics, i.e. such as to determine, as a result of compression of its surface, a temporary concentration of electric charges on the two opposing surfaces of the strip.

Piezoelectric materials commonly available commercially are nylon, quartz, Rochelle salts, etc.

A thin longitudinal tape 4 of conductor material is applied to the lower surface of the strip 2, to transfer in the manner described hereinafter the electric charges which by the piezoelectric effect are concentrated on the lower surface of the strip 2, to a conditioning circuit 6.

The function of this conditioning circuit 6 is to adapt the signal due to the electric charges to levels such as to enable it to be processed by a suitable sensing circuit connected downstream thereof.

Examples of conditioning circuits 6 are a signal reducer or amplifier, a filter or an acquisition card 8 able to convert the signal into numerical form.

The acquisition card 8 also samples the signal at the required frequency, which is preferably of the order of some thousands of samples per second.

One of the two inputs of the acquisition card 8 is connected to the output of the conditioning circuit 6, while the other input is connected to earth, to which the tape 4 of conductor material is also preferably connected via a resistor 10 of high resistance value (some MΩ), in order to refer the potential of the tape 4 to a reference potential, especially if the strip 2 is applied to an insulating floor.

The digitized signal leaving the acquisition card 8 is fed to a microprocessor 12, the function of which is to compare the sequence of numbers of the digitized signal from the acquisition card 8 with a previously stored signal corresponding to the signal caused by the impact of the body on the strip 2.

An example of a signal caused by a ball on the strip 2 is shown in FIG. 2, while an example of a signal caused by the impact of the player's foot on the same strip 2 is shown in FIG. 3.

The microprocessor 12 also implements one of the mathematical functions commonly used to obtain information on the corresponding relationship between two signals. For example, the present invention uses the cross-covariance function. The maximum value of the cross-covariance is higher the more the measured signal is similar to that stored (see Gaetano Iuculano, INTRODUCTION TO PROBABILITY, STATISTICS AND STOCHASTIC PROCESSES, in "Ingegneria e le scienze fisiche", Published by Pitagora; Bologna 1996).

FIG. 4 shows the curves obtained by comparing the signal generated by the impact of the ball with the stored signal (curve 14) and by comparing the signal generated by the impact of the foot with the stored signal (curve 16). Given the different maximum value of the cross-covariance in the two cases, they can be distinguished by fixing at the calibration stage a numerical threshold $V_s$ which is exceeded only when the impact is due to the ball.

If the threshold value $V_s$ is exceeded, the microprocessor 12 feeds a corresponding signal to an optical and/or acoustic indicator device 18 of any type.

The aforedescribed example relates to signalling the impact of a ball on a strip 2 bounding the playing area, and to distinguishing between the impact of a ball and the impact of any part of a player's body on the same strip 2.

If it is required to signal a "foot fault", i.e. the impact of a player's foot on the base line at the moment of the strike, the signal to be checked will evidently change, even though the sensing criterion is similar.

In contrast, if it is not the impact of a player's foot on a strip which is to be sensed but the exceeding of the strip by the foot (for example when throwing the javelin), an adjacent band downstream of the strip has to be equipped with the device rather than the demarcation line itself.

The same principle can be used if it is required to supply not only a positive indication in the case of impact of a ball on the strip, but also to supply a positive indication in the case of impact of the ball within or outside the strip.

In an alternative embodiment, the algorithm implemented by the microprocessor 121 can calculate a quantity related to the initial part of the signal generated by the impact of the ball on the strip. FIG. 5 shows a simplified representation of this signal with some of its parameters defined, such as the maximum negative value Vmin, a certain prefixed percentage of this value (for example 20%) p.Vmin, and the difference ΔV between these values and the time distance Δt between the moments associated with Vmin and p.Vmin.

Calculating the quantity ΔV/Δt enables the impact of the ball to be distinguished from the impact of other objects or from signals which can be generated by electrostatic phenomena.

When this quantity is greater than a prefixed threshold value Vs', the microprocessor 12 executes a further process to establish whether the impact of a ball on the strip 2 or some other phenomenon has occurred. In the first case a corresponding signal is fed to an optical and/or acoustic device 18 of any type.

The aforedescribed example relates to signalling the impact of a ball on a strip 2 bounding the playing area, and to distinguishing between the impact of a ball and the impact of any part of a player's body on the same strip 2.

It may happen that the threshold Vs' is also exceeded by the violent impact of a player's foot on the strip 2 or if an object (clothes jacket) or person charged with electrostatic electricity is in proximity to the conductor element. Then if the ratio exceeds this threshold a check is made. If the ratio ΔV/Δt is greater than a second threshold Vs", the event is classified as an electrostatic discharge and none of the warning devices 18 is activated (curve a of FIG. 5). If instead the ratio ΔV/Δt is less than Vs" but greater than Vs' (curve b of FIG. 5), this signifies that the a body has impacted on the strip 2 and in this case a check must be made to determine if this body is a foot or the ball. To achieve this, the invention determines the form of the signal close to its maximum value, for example at a prefixed percentage of its value. In this respect it has been observed that in the case of a foot the signal form is substantially symmetrical about a vertical straight line passing through the maximum (FIG. 6a), whereas in the case of a ball the signal form is decidedly asymmetrical (FIG. 6b).

If a foot fault is to be signalled, i.e. the impact of a player's foot on the base line at the moment of the strike, the signal to be checked will evidently change, even though the sensing criterion is similar.

From the aforegoing and independently of the sensing algorithm used, the it is apparent that the apparatus of the invention is particularly advantageous, and in particular:

it is of low cost,
it is of simple construction, both because of the small number of components used and because of its circuit simplicity,
it is easy and quick to install, as the strip 2 can be formed of piezoelectric material with the tape 4 of conductor material applied,
it is of very small overall size, as it can be contained in a small box, to be disposed on the field,
it can be connected to external signalling devices already present on the playing field.

In a different embodiment, the invention uses a strip of material which in addition to presenting piezoelectric characteristics also presents triboelectric characteristics different from those of the constituent material of the ball, and generally of the body, of which the impact is to be sensed. The triboelectric effect is known (see Grande Dizionario Utet, vol. XVIII, p. 669, Turin 1976) to be an electrical phenomenon consisting of transferring electrical charges, and hence generating a voltage, when two different materials are rubbed together. This generated voltage has a value proportional to the charge quantity transferred and depends mainly on the attitude of the used materials to accept or to yield electrons following rubbing.

In relation to this different attitude of the different triboelectric materials, they are classified into a scale (triboelectric series), at the top of which are those materials with the greatest tendency to yield electrons (air and nylon) and hence to charge positively, and at the bottom of which are those materials with the greatest tendency to acquire electrons (Teflon and PVC) and hence to charge negatively.

The greater the distance, measured along the triboelectric scale, between the material forming the ball and the material forming the strip 2, the greater is the triboelectric effect which develops at the moment in which the ball impacts on the strip, and hence the value of the voltage generated at the moment of the impact.

This voltage also depends on many other factors such as:
the nature of the strip and ball surfaces,
the extent of the contacting surfaces,
the contact pressure,
the rubbing intensity,
the atmospheric conditions (e.g. humidity),
the presence of contaminants or oxidants,
the speed with which the ball separates from the strip.

The ball impact can be sensed with one of the described algorithms relative to the preceding embodiment, which uses only the piezoelectric effect.

What is claimed is:

1. An apparatus for sensing impact of a body on a strip located on a support, comprising:
a strip of material presenting piezoelectric characteristics, applicable to the support in a region to be monitored,
at least one continuous tape made of conductive material and associated with said strip in a manner parallel to it,
a conditioning device connected to said tape to condition an electric signal generated by the impact of said body on said strip,
a signal sensing device for sensing said conditioned electric signal,
a signaling device for indicating the sensed signal,
wherein a signal recognition device is associated with the signal sensing device,
wherein the signal recognition device comprises a circuit for comparing characteristics of said conditioned electric signal with characteristics of a signal typical of an impact of said body under observation on said strip,
wherein the circuit comprises:
means for determining a maximum negative value ($V_{min}$) of said conditioned electric signal provided by the impact of said body on said strip, means for determining a prefixed percentage ($p.V_{min}$) of said maximum negative value ($V_{min}$), means for determining a difference ($\Delta V$) between said maximum negative value $V_{min}$ and said prefixed percentage value ($p.V_{min}$) and a time difference ($\Delta t$) between the moments associated with said values ($V_{min}$, $p.V_{min}$), means for determining a ratio ($\Delta V/\Delta t$) of said difference ($\Delta V$) to said time difference ($\Delta t$), means for comparing said ratio ($\Delta V/\Delta t$) with a prefixed threshold value ($V_s'$), and means for feeding a signal to said signaling device when said ratio ($\Delta V/\Delta t$) exceeding said threshold value ($V_s'$).

2. The apparatus as claimed in claim 1, wherein said strip is made of material which in addition to presenting piezoelectric characteristics also presents triboelectric characteristics different from those of a constituent material of said body, the impact of which is to be sensed.

3. The apparatus as claimed in claim 1, wherein said continuous tape is applied to at least one surface of said strip.

4. The apparatus as claimed in claim 2, wherein the said continuous tape is positioned in an immediate vicinity of said strip.

5. The apparatus as claimed in claim 4, wherein said continuous tape is applied to a lower surface of the support, to an upper surface of which said strip is applied.

6. The apparatus as claimed in claim 1, wherein the conditioning device consists of an amplifier of high input impedance.

7. An apparatus for sensing impact of a body on a strip located on a support, comprising:

a strip of material presenting piezoelectric characteristics, applicable to the support in a region to be monitored, at least one continuous tape made of conductive material and associated with said strip in a manner parallel to it, a conditioning device connected to said tape to condition an electric signal generated by the impact of said body on said strip, a signal sensing device for sensing said conditioned electric signal, a signaling device for indicating the sensed signal, wherein a signal recognition device is associated with the signal sensing device, wherein the signal recognition device comprises a circuit for comparing characteristics of said conditioned electric signal with characteristics of a signal typical of an impact of said body under observation on said strip, wherein the circuit comprises:

means for determining a maximum negative value ($V_{min}$) of said conditioned electric signal provided by the impact of said body on said strip, means for determining at least one prefixed percentage ($p.V_{min}$) of said maximum negative value ($V_{min}$), means for determining a form of said signal in a vicinity of said maximum negative value ($V_{min}$) defined by said prefixed percentage value ($p.V_{min}$), means for determining a difference ($\Delta V$) between said maximum negative value ($V_{min}$) and said prefixed percentage value ($p.V_{min}$) and a time difference ($\Delta t$) between the moments associated with said values ($V_{min}$, $p.V_{min}$), means for determining a ratio ($\Delta V/\Delta t$) of said difference ($\Delta V$) to said time difference ($\Delta t$), means for comparing said ratio ($\Delta V/\Delta t$) with two separate prefixed threshold values ($V_s'$, $V_s''$), and means for feeding a signal to said signaling device when said ratio ($\Delta V/\Delta t$) lies between said threshold values ($V_s'$, $V_s''$) and the signal form is significantly asymmetrical in the vicinity of said maximum negative value ($V_{min}$) about a vertical straight line passing through said maximum negative value ($V_{min}$).

8. The apparatus as claimed in claim 7, comprising means for determining a time interval between a moment in which said conditioned electric signal is said maximum negative ($V_{min}$) and each of two moments in which said signal assumes a value equal to the same percentage ($p.V_{min}$) of said maximum negative value ($V_{min}$), and means for comparing two time intervals thus determined.

9. The apparatus as claimed in claim 7, wherein said strip is made of material which in addition to presenting piezoelectric characteristics also presents triboelectric characteristics different from those of a constituent material of said body, the impact of which is to be sensed.

10. The apparatus as claimed in claim 7, wherein said continuous tape is applied to at least one surface of said strip.

11. The apparatus as claimed in claim 9, wherein said continuous tape is positioned in an immediate vicinity of said strip.

12. The apparatus as claimed in claim 11, wherein said continuous tape is applied to a lower surface of the support, to an upper surface of which said strip is applied.

13. The apparatus as claimed in claim 7, wherein the conditioning device consists of an amplifier of high input impedance.

* * * * *